March 12, 1935.  F. T. KAELIN  1,993,843
ELECTRIC STEAM GENERATOR
Filed Nov. 18, 1931
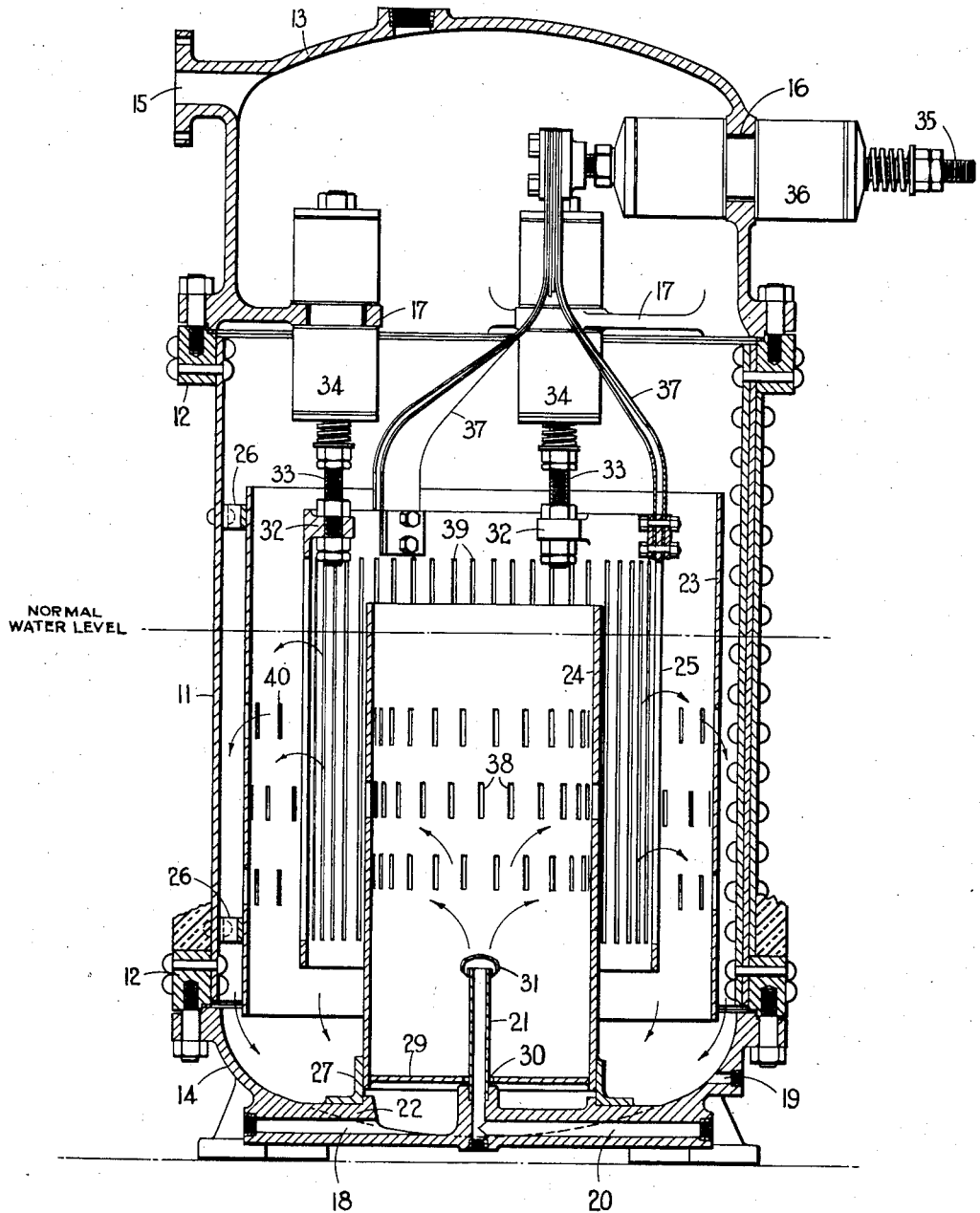
INVENTOR
FREDERICK T. KAELIN.
ATTORNEY Patented Mar. 12, 1935

1,993,843

UNITED STATES PATENT OFFICE 1,993,843

ELECTRIC STEAM GENERATOR

Frederick T. Kaelin, Montreal, Quebec, Canada

Application November 18, 1931, Serial No. 575,919

15 Claims. (Cl. 219—40)

This invention relates broadly to improvements in electric steam generators of the water resistance type and to method of controlling same, and relates more particularly to a class of electric steam generator of the above type adapted for use on a moving vehicle such as a railway train.

The objects of the invention include provision of a method of and means for reducing the amount of water bled from the generator, while at the same time obtaining a higher concentration of soluble impurities in the bleed water, as compared with the amount and impurity concentration of water normally bled from stationary generators. A further object is the provision of means for isolating water entering the generator from water about to be discharged from the generator, thereby to prevent loss of water as a result of entering water mingling with the outgoing water. A still further object is to ensure passage through the electric discharge field in the generator of all water entering the generator. Another object is to reduce the amount of water necessarily carried on a vehicle for use in the generator.

Various other objects and the advantages of the invention may be ascertained from the following description and the accompanying drawing.

Electric steam generators of the water resistance type have been, heretofore, usually constructed with an electrode containing boiler having a depending water leg of less diameter than the boiler, as shown, for instance, in my prior Patents Nos. 1,476,080, 4th December 1923, 1,513,250, 28th October 1924, and 1,525,998, 10th February 1925. In such boilers the water is introduced in a central upwardly moving stream which diffuses through the water in the boiler and flows down through the discharge field between the electrodes, whereby the water is heated by passage of electric current therethrough and a substantial part of it evaporated. The water passing out of the electric discharge zone carries the non-volatile impurities of the water which has been evaporated and these impurities, the most important of which are salts in solution, so increase the electric conductivity of the water that it is not expedient to repass this water through the electric discharge field on account of the great increase in current which would input proportional to steam output which would result. Consequently, this highly conductive water must be discharged and to enable this it has been customary to supply water in excess of steam requirements to an extent necessary to compensate for the discharge of the highly conductive and impure water. In stationary generators, the water leg with a bleed off at the bottom serves to receive the highly conductive water leaving the discharge field and to segregate this highly conductive water from that entering and already in the boiler. The central upward stream of entering water has been found most satisfactory as it does not produce eddy currents of water in the generator and does not, in a stationary generator as shown in Fig. 1 of Patent No. 1,525,998, diffuse to any detrimental extent in the surrounding descending stream of impure highly conductive water flowing to the bleed outlet at the bottom of the water leg and considerably below the point of water inlet. Since the arrangement produces a rising stream of cold water and a descending stream of hot water, it is obvious that very little disturbance of the water would be required to destroy the satisfactory flow of water and cause the cold entering water to flow by the shortest path from the inlet to the lower outlet.

In a stationary boiler and with the use of water leg, the oppositely flowing streams of water do not mingle to detrimental extent. With a liberal supply of water it is immaterial if some of the incoming water mingles with the outgoing water and is lost. The amount of bleed off can be increased to compensate. Likewise, if some of the impure water mingles with the entering water, the supply of fresh water can be increased to such extent that the impurities introduced are in such small proportion to the fresh water that they do not unduly increase its conductivity. The greater input of water to keep the conductivity down is not of itself significant in a stationary generator but is significant in that the greater rate of water input and bleed off causes a greater heat loss through the bleed off.

In a mobile generator, especially one in which space limitations preclude use of a water leg, the movement of the generator will tend to disturb proper flow of water and unless provision is made to prevent it, much of the incoming water will pass directly to the bleed off. This loss coupled with the larger supply that would be necessary to keep the impurity concentration suitably low would necessitate carrying a prohibitively large amount of water and would entail a prohibitive heat loss through the bleed water.

According to this invention, electric steam generators, particularly those not provided with water legs and those designed for use on vehicles such as railway trains, are provided with means to isolate the incoming water from the water which has passed through the discharge field whereby all the water is compelled to pass through the discharge field and contamination of the incoming water and dilution of the outgoing water are positively prevented. This isolation of the two kinds of water serves as a means of regulating the amount of and impurity concentration in the bleed water as well as regulating the proportion of water passed through the discharge field and the heat loss through the bleed water. The means for effecting the above mentioned isolation comprises essentially a wall interposed between the water inlet and the bleed outlet, said wall being imperforate below the lower ends of the electrodes, thereby to compel the incoming water to flow through the discharge field between the electrodes before it can reach the bleed outlet. In greater detail the invention comprises the features and combinations of features hereinafter disclosed and claimed, together with all such modifications of and substitutions for the details disclosed as shall fall within the scope of the claims.

In the accompanying drawing which illustrates one embodiment of the invention, but to which embodiment and the details thereof the invention is not confined, as other embodiments and modifications of or substitutions for details are possible:—

The single figure in the drawing is a central vertical sectional view of an electric steam generator constructed according to this invention.

Referring more particularly to the drawing, 11 designates a preferably cylindrical shell constructed of boiler plate or other suitable material and provided at its ends with flanges 12 to which the upper and lower ends 13 and 14 respectively are attached in any suitable way. As a matter of convenience in manufacture, it has been found advisable to cast the upper and lower ends, thereby to facilitate the provision of various outlets and supporting members. On account of the internal pressures to be resisted, it is preferable to make the ends of dished formation with the concave surface thereof facing inwardly as will be seen. The upper end is provided with a steam outlet 15, an aperture 16 for passage of an electric conductor and a plurality of electrode supporting brackets 17. The lower end 14 is provided with a laterally directed blow-off passage 18 leading from the lowest point of the internally concave bottom and with a laterally directed bleed off passage 19. The bottom is further provided with a laterally directed water inlet conduit 20 extending to the axis of the structure where it turns upwardly so as to receive a vertically disposed detachable extension 21. The bottom is internally provided with a plurality of upstanding lugs or bosses 22 for the purpose of supporting the inner ground electrode, as will be hereafter described.

As shown, the boiler contains outer and inner ground electrodes 23 and 24 of cylindrical form and a cylindrical live electrode 25 disposed intermediate the ground electrodes and in spaced relation thereto, all three electrodes being arranged co-axially with respect to the boiler so that the electrodes are in surface parallel relation. The outer ground electrode 23 is supported on the shell 11 by means of the brackets 26, which also serve to electrically connect the electrode with the boiler shell and to support the same rigidly in spaced relation to the boiler shell. The inner surface of the ground electrode 23 is perfectly smooth, so as to obtain uniform current density at the surface of the electrode and avoid local concentrations of current, as would be the case if the discharge were directly between the live electrode and the shell 11. The inner ground electrode 24 is externally smooth surfaced and is supported in any suitable way on the bosses 22, for example by means of feet 27, which rigidly connect the electrode with the boiler bottom and at the same time establish electrical connection between the two members. As illustrated, the lower end of the electrode terminates some distance above the boiler bottom, so as to provide a free passage under the electrode to enable water surrounding the electrode to reach the blow off outlet 18. It will be understood that the particular supporting construction of the electrode may be varied from that shown as long as a water flow passage is provided leading to the blow off. The inner ground electrode is provided at or near its lower end with a closure plate 29 centrally apertured at 30 for the passage of the water conduit extension 21. This aperture 30 is preferably sufficiently larger in diameter than the pipe 21 to provide a drainage opening leading from the space within the electrode into the boiler space therebelow. The upper end of the conduit extension 21 may be provided with an apertured water dispersing cap 31.

The live electrode 25 is provided with internal lugs 32 to which suspension rods 33 are adjustably attached, the suspension rods being in turn supported by the brackets 17 through the agency of insulators 34. A current conductor 35 passes through an insulator 36 mounted in the aperture 16 and includes flexible portions 37 extending from the inner end of the insulator to spaced points in the circumference of the live electrode. The detailed construction of the insulators 34 and 36 and of the electric conductor and live electrode supports may be ascertained by reference to my copending application Serial No. 575,920 filed of even date herewith. The electrode supporting rods 33, being disposed at spaced points in the circumference of the electrode, afford a rigid support to the electrode so as to substantially maintain it in surface parallel relation with the outer and inner ground electrodes. While the boiler illustrated is of the single phase type and therefore need contain but one live electrode, it will be understood that if the boiler is connected to more than one phase of a circuit, the number of electrodes may be increased to agree with the number of phases in the circuit and that in such case the live electrodes need not be completely cylindrical, but will preferably be cylindrically curved plates arranged at intervals around the inner ground electrode, as shown in my Patent No. 1,476,030.

The outer ground electrode 23 projects downwardly below the lower end of the live electrode 25, so as to avoid possibility of discharge from the lower end of the electrode to internal projections on the boiler. The inner ground electrode extends upwardly from substantially the boiler bottom to a suitable height within the live electrode, preferably to an elevation above the normal water level. The inner ground electrode is preferably imperforate from the level of the lower end of the live electrode downwardly and, above the level of the lower end of the live electrode, the inner ground electrode is provided with a series of apertures 38, of any suitable size, shape, number and arrangement. Water emerging from the top of the conduit extension 21 flows in a general upward and outward direction and passes through the apertures 28 into the space between the inner ground electrode and the live electrode. The live electrode is provided with a plurality of apertures 39, preferably in the form of slots which permit the water to flow outwardly into the space between the live electrode and the outer ground electrode. If desired, the outer ground electrode may also be provided with water flow apertures 40 but these last are not now deemed essential.

It will be readily seen from the drawing that the imperforate lower portion of the inner ground electrode and the closure 29 in the bottom of the electrode constitute a wall interposed between the water entering the boiler from the pipe 21, and the water surrounding the inner ground electrode in the lower part of the boiler, and also constitute a wall between the water inlet 21 and the bleed outlet 19. It will further be observed that the depth of water in the boiler below the live electrode is equal to approximately half the diameter of the live electrode and equal to approximately one-third the internal diameter of the boiler. While these proportions are not absolute, they represent a fair average of the proportions of a practical structure.

The operation of the device is as follows:—

The boiler having been filled with water to approximately the level indicated and suitable current supplied to the conductor 35, discharge takes place through the water between the live electrode and the outer and inner ground electrodes, thereby heating the water and converting the same to steam. Water is supplied through the conduits 20 and 21 usually in a continuous manner and at a rate in excess of the rate of evaporation. Water is allowed to escape through the bleed outlet 19 at such rate as is necessary to maintain an approximately constant water level in the boiler. The body of water within the inner ground electrode is not subject to electric discharge therethrough, but the body of water in the spaces between the live electrode and the two ground electrodes is subject to this discharge and to evaporation, whereby all the non-volatile impurities contained in the water which has been evaporated remain in the outer body of water and have the effect of increasing the electric conductivity of the water. If these impurities were allowed to remain, the conductivity of the water would soon increase to such an extent that the current input would be prohibitively high in proportion to the steam output. It is for this reason that water which has been through the discharge field between the electrodes must be removed in order to prevent an undesirable accumulation of impurities, the most important of which are salts in solution. The fresh water entering through the pipe 21 flows upwardly and outwardly and escapes through the apertures 28 into the space between the inner ground electrode and the live electrode and flows from this space through the apertures 29 of the live electrode into the space between the live electrode and the outer ground electrode. Owing to the normally constant withdrawal of water through the bleed outlet 19, a downward flow of water is established in the discharge field between the electrodes, so that the water which has been through the discharge field and contains a concentration of impurities eventually reaches the annular space in the bottom of the boiler around the inner ground electrode, which space constitutes a reservoir for impure water about to be discharged. The imperforate lower portion of the inner ground electrode and the bottom closure 29 of the electrode constitute a wall separating the incoming pure water and the outgoing impure water and prevent any intermingling of the two bodies of water, so that contamination of the pure water and dilution of the impure water are avoided. The annular drainage opening 30 through the bottom closure around the water conduit 31 is of such small area that the amount of water which can flow through this opening directly to the bleed outlet 19 is negligible and the structure may be regarded as effecting a complete separation of pure and impure water. The wall between the pure and the impure water prevents passage of entering pure water directly to the bleed outlet 19, and thereby avoids loss of water in this way. Furthermore, the interposition of this separating wall between the pure and impure water compels all the water supplied to the generator to pass through some part at least of the discharge field between the electrodes, whereby the water input relatively to the steam output is less than in generators not provided with adequate water separating means. The separation of incoming and outgoing water, which prevents contamination of the incoming water, avoids the necessity of supplying additional water to offset the contamination and maintain the conductivity of the water sufficiently low. Avoidance of contamination of incoming water, thereby keeping the conductivity low, enables a given steam output to be obtained with less current input than if the incoming water was contaminated by diffusion of impure water thereinto. The separation of incoming and outgoing water further avoids dilution of the outgoing water and thereby ensures removal of accumulated impurities with a minimum loss of water. From the foregoing, it will be readily seen that the feature of a positive separation of incoming and outgoing water is of considerable importance and is a practical necessity in a mobile generator where variations in movement of the generator would cause extensive mingling of the incoming and outgoing water if the two streams were in contact with one another, this being more particularly the case owing to the fact that the flow of water is contrary to the natural flow which would be induced by the thermal conditions in the generator. In a generator adapted for service on railway trains where space limitations preclude provision of a depending water leg to segregate the impure water at a materially lower level than the pure water inlet, the positive separation of the incoming and outgoing water as herein disclosed becomes a very important feature of construction and of control in operation.

In the operation of the generator, the supply of fresh water of low conductivity to the lower part of the electrodes is very important, since this water dilutes the impure water of higher conductivity descending from the upper part of the electrodes and thereby reduces the conductivity of the water at the lower part of the discharge field where the current density is greatest and where water of low conductivity is essential to obtain an efficient rate of evaporation and to avoid excessive current input.

Having thus described my invention, what I claim is:—

1. In an electric steam generator; a boiler, the lower part of which constitutes a reservoir for water of high electric conductivity; means for admitting water at the lower part of said boiler; and means to prevent water entering the boiler at said admitting means from mingling immediately with the water of high electric conductivity in the lower reservoir portion of the boiler.

2. In an electric steam generator; a boiler, the lower part of which constitutes a reservoir for water of high electric conductivity; means for admitting water at the lower part of said boiler; means for bleeding water from the lower reservoir portion of the boiler; and means interposed between said admitting means and said bleeding means to prevent water passing directly from the admitting means to the bleeding means.

3. In an electric steam generator; a boiler, the lower part of which constitutes a reservoir for water of high electric conductivity; a ground electrode and a live electrode disposed in spaced relation in said boiler; means for admitting water at the lower part of the boiler; means for bleeding water from the lower reservoir part of the boiler; and means interposed between said admitting means and said bleeding means adapted to compel flow of water from the admitting means through the discharge field between the electrodes to the bleeding means.

4. In an electric steam generator; the combination with a boiler having water admitting means and water bleeding off means at its lower end and spaced electrodes within the boiler; of means to increase the concentration of soluble impurities in the water discharged through the bleeding means, comprising a wall interposed between the admitting means and the bleeding means, directing water through the discharge field between the electrodes whereby the concentration of solubles in the water is increased by evaporation of water, said means separating incoming water from water which has been through the electrode field and thereby preventing dilution of water which has been through the discharge field of the electrodes by the incoming water.

5. In an electric steam generator; a boiler, the lower part of which constitutes a reservoir for water of high electric conductivity; a live and a ground electrode supported in spaced relation in the boiler, one of said electrodes being apertured to permit passage of water laterally therethrough into the space between the electrodes; water admitting means and water bleeding off means at the lower part of said boiler and a tubular member surrounding the admitting means and extending to a level near the tops of said electrodes, said tubular member constituting a container for freshly admitted water of low electric conductivity and serving to isolate freshly admitted water from the water of high electric conductivity contained in the lower reservoir portion of the boiler, said tubular member being apertured to permit lateral flow of water therefrom to the electrodes.

6. In an electric steam generator; a boiler; an upright tubular member therein dividing the interior space of the boiler into an inner compartment and a surrounding outer compartment; a live electrode supported in said outer compartment and spaced above the boiler bottom; means for admitting water into said inner compartment, said tubular member being formed to permit lateral flow of water to the outer compartment only at levels above the bottom of said electrode; and means for bleeding water from said outer compartment.

7. In an electric steam generator; a boiler; an upright tubular member therein dividing the interior space of the boiler into an inner compartment and a surrounding outer compartment; a live electrode supported in said outer compartment; means for admitting water into said inner compartment, said tubular member being formed to prevent lateral flow of water below the electrode to the outer compartment; and means for bleeding water from said outer compartment.

8. In an electric steam generator; a boiler; a cylindrically curved live electrode supported therein; a tubular cylindrical ground electrode supported on the boiler bottom in surface parallel spaced relation to said live electrode; means separate from said ground electrode for admitting water within said ground electrode; and means for bleeding off water at a point outside said ground electrode.

9. Structure according to claim 8, in which the ground electrode is imperforate below the live electrode and perforate above the bottom of the live electrode, thereby to permit flow of water between the electrodes while preventing flow of water directly from the admitting means to the bleeding means.

10. Structure according to claim 8, in which the ground electrode is supported in spaced relation above the boiler bottom; including a plate closing the lower end of said ground electrode.

11. Structure according to claim 8, in which the boiler includes a drainage outlet below the ground electrode; the ground electrode being formed to provide an opening leading from the space surrounding the ground electrode to the drainage outlet; and in which the ground electrode is provided with a closure plate above said opening, said plate being apertured to permit drainage of the space within the ground electrode, the plate aperturing being of such limited dimensions that no material amount of water will flow directly from the admitting means to the bleeding means during operation of the boiler.

12. In an electric steam generator; the combination with a boiler having water admitting means and water bleeding off means at its lower end and spaced electrodes within the boiler; of means to reduce the amount of water discharged through the bleeding means, comprising a wall interposed between the admitting means and the bleeding means directing water through the discharge field between the electrodes, whereby the concentration of solubles in the water is increased by evaporation of water, and preventing any of the incoming water passing directly to the bleeding means whereby no water which has not passed through the discharge field between the electrodes is discharged through the bleeding means.

13. In an electric steam generator; a fluid container of substantially uniform diameter from top to bottom; a pair of cylindrically curved electrodes disposed in surface parallel relation in said container and spaced from the bottom thereof; a tubular member disposed in said container axially coincident with the axis of electrode curvature, said tubular member being supported on the container bottom and extending above the lower ends of the electrodes; means to admit water to the container at a point within the tubular member; means to bleed water from the container at a point external of said tubular member and below the electrodes; the tubular member being imperforate below the lower ends of the electrodes and apertured above the lower ends of the electrodes.

14. In an electric steam generator; a fluid container of substantially uniform diameter from top to bottom; a pair of cylindrically curved electrodes disposed in surface parallel relation in said container and spaced from the bottom thereof; a tubular member supported on the container bottom and disposed within the arcs of curvature of said electrodes; a water inlet conduit extending into the lower part of said tubular member; a bottom closure member for said tubular member located below the outlet end of said conduit and spaced above the container bottom; means external of said tubular member and below said electrodes for bleeding water from the container; said tubular member being imperforate below the lower ends of the electrodes and apertured above the lower ends of the electrodes.

15. In an electric steam generator; a boiler having an internally concave bottom; an upright tubular member supported on the boiler bottom; a closure member in the lower portion of said tubular member, spaced above the boiler bottom; a water inlet conduit leading into the tubular member through said closure member; means external of said tubular member for bleeding water from the boiler; electrodes arranged in surface parallel relation to one another outside said tubular member and spaced from the boiler bottom, the electrode nearest the tubular member being apertured; said tubular member being imperforate below said electrodes and apertured above the lower ends of the electrodes thereby to permit flow of water to and through the apertured electrode while preventing flow of water directly from the conduit to the bleeding means; said boiler bottom having a blow off outlet beneath the bottom closure of the tubular member and said closure member being formed with an aperture of sufficient size to permit drainage of water from the tubular member but of insufficient size to permit any material flow of water to the bleeding means.

FREDERICK T. KAELIN.